UNITED STATES PATENT OFFICE.

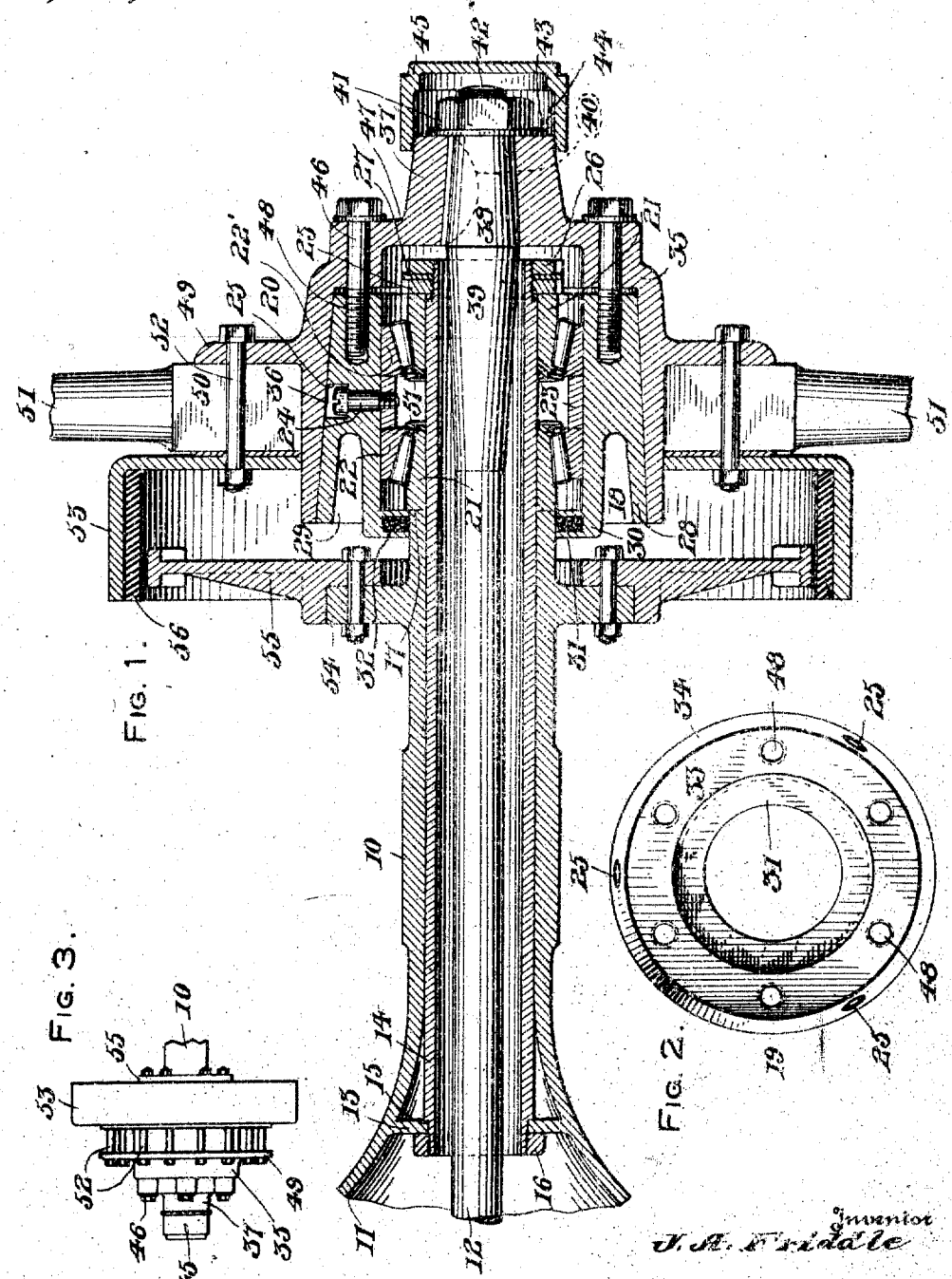

JAMES A. FRIDDLE, OF CLEVELAND, OHIO.

AUTOMOBILE-WHEEL-MOUNTING-HUB CONSTRUCTION.

1,279,318.     Specification of Letters Patent.    Patented Sept. 17, 1918.

Application filed July 23, 1917. Serial No. 182,235.

*To all whom it may concern:*

Be it known that I, JAMES A. FRIDDLE, a citizen of the United States, residing at Cleveland, in the county of Cuyahoga and State of Ohio, have invented certain new and useful Improvements in Automobile-Wheel-Mounting-Hub Constructions, of which the following is a specification.

The primary object of the invention is the provision of a mounting for wheels which permits the removal of heavy wheels, such as truck wheels, whenever found desirable, the same being accomplished without requiring any re-adjustment of the anti-friction bearings, the structure possessing great strength and durability.

A further object of the device is the provision of a wheel construction in which the bearings may be readily adjusted before the wheel is applied thereto, such adjustment being secured so that the wheel may be put on and taken off at will without requiring the re-adjustment of the bearings.

It will be understood that in mounting for large and heavy wheels, such as those employed upon motor vehicles, it is often difficult to properly adjust the anti-friction bearings between the wheel hub and the mounting axle and the present provision renders such operation easily and accurately accomplished, while also serving as a demountable wheel construction, while the parts comprising the construction may be readily removed and replaced as becomes necessary under wearing conditions.

With these general objects in view and others that will appear as the nature of the invention is better understood, the same consists in the novel combination and arrangement of parts hereinafter fully described, illustrated in the accompanying drawings and then claimed.

In the drawings forming a part of this application and in which like designating characters refer to corresponding parts throughout the several views, Figure 1 is a central, sectional view through the device and a portion of an automobile axle associated therewith, the spokes of the wheel being broken away, Fig. 2 is an end elevation taken from the forward side of the bearing hub detached, and Fig. 3 is an elevational view of the device upon a reduced scale.

It being understood that my device is adapted for the mounting of vehicle wheels, such as the wheels of an automobile upon pre-adjusted anti-friction bearings, the same is herein illustrated in connection with the rear driving construction of a motor vehicle having a hollow axle 10, projecting from the differential casing 11, and arranged with the wheel driving spindle or shaft 12 centrally extending therethrough. An annular web 13 is arranged adjacent the merging point between the casing 11, and axle 10, having a sleeve 14 extending entirely through the axle 10 and through the said web 13, with a shouldered engagement therewith as at 15, and arranged with a nut 16, mounted upon the threaded projecting inner end of the sleeve and in contact with the inner face of the web 13.

The sleeve 14, projects outwardly of the free end 17, of the axle 10, a sufficient distance for the mounting of anti-friction bearing members thereon. Double anti-friction bearings in the form of roller bearings 18, are arranged in spaced relation upon the projecting outer end of the sleeve 14, for rotatably mounting the tubular bearing hub 19 in permanent journaled relation for the detachable reception of a wheel 20, thereon.

The bearings 18 are identical in construction but are oppositely arranged upon the sleeve 14, the inner bearing comprising a ring 21, fitted upon the sleeve 14 in contact with the free end 17, of the axle 10 and arranged with the tapered rollers of the bearing positioned there-around while a ring 22, is mounted upon the rollers. The outer bearing 18 comprises a ring 21' similar to the ring 21 and has an outer ring 22' concentric therewith with the rollers of the bearing arranged between the rings 21' and 22'.

The bearing hub 19 is mounted upon the said outer rings 22 and 22' and has a spacer or annulus 23 substantially centrally positioned therein arranged between the rings 22 and 22' for maintaining the bearings 18 in normal spaced relation within the hub.

Retaining screws 24 are positioned through socketed perforations 25 arranged radially through the hub 19 for threaded engagement with the annulus 23. A retaining nut 25 is threaded upon the outer end of the sleeve 14 abutting against the outer end of the ring 21', while a lock nut 26 is arranged outwardly thereof with a packing washer interposed between the said nuts.

It will be understood that in this manner the bearing hub 19 is anti-frictionally journaled upon the sleeve 14 and that the adjustment of the bearings 18 may be readily made before the wheel 20 is mounted thereon. Such adjustment will be made for whatever weight of wheel and traffic conditions the bearing is designed to accommodate. The inner end 28 of the hub 19 is annularly channeled forming an end groove 29 having an inner flange 30 slightly projecting beyond the end 28 of the hub and with an inwardly projecting bead 31 for accommodating suitable packing 32 engaging the axle 10 adjacent its free end 17.

In this manner, the bead 31 and packing 32 lie concentrically inwardly of the inner face or end 28 of the hub 19 adjacent the bearing ring 21. The hub 19 has the general form of a truncated cone with its apex end 33 positioned outwardly and in a plane substantially on a line with the outer face of the bearing ring 21' and with its tapered periphery 34 adapted for the sliding reception of a wheel hub in wedging engagement thereon.

The wheel 20 comprises a tubular hub 35 having a tapered axial socket 36 for receiving the bearing hub 19 and has a reduced outer end 37 adapted for the reception of the end portion 38 of the spindle 12, therethrough. The outer end portion of the said spindle may be enlarged as at 39, if desired, for adding strength to the portion thereof operatively attached to the wheel 20 for driving the same while the spindle portion 38 is fitted with a splined key 40 projecting into the hub extension 37, retaining the hub 20 fixed upon the operating spindle 12 for turning therewith during the propulsion of the vehicle.

A lock nut 41 is threaded upon the outer reduced end 42 of the spindle 12 while a washer 43, is preferably interposed between the nut 41 and the outer face 44 of said extension 37. A cover or cap 45 is threaded upon the extension 37, after the manner of the usual hub cap, for protecting the outer extremity of the spindle 12 and the locking nut 41.

It will be understood that any desired manner of connecting the hub 35 with its driving spindle 12, other than that herein shown, may be employed while these features will be entirely eliminated in mounting wheels which are not designed as drive wheels and in such instances the wheel hub 35 will be attached only to the bearing hub 19 for revolving therewith. Retaining bolts 46 are extended through the outer shoulder or face 47 of the hub 35, having screw threaded engagement with the sockets 48 arranged in the end 33 of the bearing hub 19.

It will be evident that upon placing the wheel hub 35 upon the mounting hub 19, the bolts 46 may be tightened for drawing the hub 35 in wedging engagement therewith, while a removal of the bolts 46 permits the wheel 20 to be removed from the bearing hub 19, together with the spindle 12 or individually without interfering with the spindle upon detaching the connections between the spindle end 38 and the extension 37 of the wheel hub 35. A radially arranged mounting ring-socket 49 is carried by the hub 35 for receiving the inner squared ends 50 of the spokes 51 of the wheel 20, while bolts 52 are provided for retaining the spokes in position as well as for securing a brake drum 53 upon the hub 35, inwardly of the spokes when found desirable in connection with drive wheels having band brakes.

In connection with such brakes, a flange 54, may be arranged upon the axle 10 for mounting a spider 55 or similar member in connection with the expansion band 56 of the brake of any desired form, it being understood that a contracting band, not shown, may be arranged for frictional engagement exteriorly of the drum 53, if desired, in any well known manner.

It will be understood that the sleeve 14 may be tightly fitted within the axle 10 while packings or bearings, not shown, may be arranged between the spindle 12 and the sleeve 14, if required. A serviceable mounting, for any form of vehicle wheel, is arranged in which the bearings 18 may be first adjusted with the bearing hub 19 mounted thereon, while the wheel is detachably carried by the bearing hub, the adaptation of the structure for front wheels of vehicles provided with swinging steering spindles or otherwise will be apparent from this detailed description of my device.

This construction is also serviceable in mounting wheels upon vehicles other than automobiles, such for instance as carriages and wagons and gun-carriages. While the form of the invention herein set forth is believed to be preferable, being a strong and serviceable arrangement, it will be understood that minor changes may be made therein without departing from the spirit and scope of the invention as claimed. The guard rings 57 may be arranged for the bearings 18 inwardly of the annulus 23, if desired, while similar rings could also be carried outwardly of the bearings.

What I claim as new is:—

1. A device of the class described, comprising in combination with a differential housing having a tubular axle extending therefrom, a web internally arranged adjacent the point of connection between said axle and housing, a sleeve fitted within the axle having a shouldered inner end extending through said web a lock nut upon the inner end of the sleeve engaging the said web, the outer end of the sleeve projecting outwardly of the axle, a bearing hub anti-frictionally mounted upon the projecting portion of the sleeve and means for maintaining the said hub thereon.

2. In combination with the tubular axle of a vehicle, a web within said axle, a sleeve removably positioned within the axle detachably secured to said web and with a portion of the sleeve projecting outwardly of the free end of the axle, anti-friction bearings upon said end portion of the sleeve adjacent the outer end of the axle, and retaining means for said bearings.

In testimony whereof I affix my signature.

JAMES A. FRIDDLE.